United States Patent [19]

Lin et al.

[11] Patent Number: 5,991,884
[45] Date of Patent: *Nov. 23, 1999

[54] METHOD FOR REDUCING PEAK POWER IN DISPATCHING INSTRUCTIONS TO MULTIPLE EXECUTION UNITS

[75] Inventors: Derrick Chu Lin, Foster City; Varsha P. Tagare, Sunnyvale; Ramamohan Rao Vakkalagadda, Fremont, all of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/724,172

[22] Filed: Sep. 30, 1996

[51] Int. Cl.$^6$ .................................................. G06F 1/00
[52] U.S. Cl. .................. 713/300; 713/322; 712/204; 712/211; 712/216; 712/217; 712/219; 712/233
[58] Field of Search ............................ 395/750.04, 387, 395/393, 380, 580, 395, 392; 713/322, 300; 712/211, 217, 204, 219, 216, 233

[56] References Cited

U.S. PATENT DOCUMENTS

| | | | |
|---|---|---|---|
| 5,394,558 | 2/1995 | Arakawa et al. ........................ | 395/800 |
| 5,632,037 | 5/1997 | Maher et al. ............................ | 395/750 |
| 5,678,016 | 10/1997 | Eisen et al. ............................. | 395/392 |
| 5,689,674 | 11/1997 | Griffith et al. ........................... | 395/393 |
| 5,713,012 | 1/1998 | Tanaka et al. ........................... | 395/580 |
| 5,751,981 | 5/1998 | Wiitt et al. ............................... | 395/380 |
| 5,761,476 | 6/1998 | Martell .................................... | 395/395 |

OTHER PUBLICATIONS

Su, Tsui, Despair., Title: Saving power in the control path of embedded processors., Source: IEEE p: 24 to 31., ISSN: 0740–7475, Winter 1994.

Authors: Ching–Long Su., Chi–Ying Tsui., Despair, A.M. Title: Low power architecture design and compilation technifies for high–performance processors., Source: Compcon Spring '94 pp. 489–498 Sponsors IEEE ISBN:0–8186–5380–9.

*Primary Examiner*—Ayaz R. Sheikh
*Assistant Examiner*—Frantz B. Jean
*Attorney, Agent, or Firm*—Blakely, Sokoloff, Taylor & Zafman LLP

[57] ABSTRACT

A method of reducing microprocessor peak power by scheduling execution of instructions to multiple execution units. In the prior art, parallel processing of instructions by high-power execution units caused the microprocessor peak power to increase. The method of the present invention attempts to reduce microprocessor peak power by ensuring that two high-power execution units are not executing simultaneously. While a first instruction is being executed by a first execution unit, a first signal is asserted. A second instruction is prevented from being dispatched to a second execution unit while the first signal is asserted. Thus, the second execution unit remains in an idle state while the first execution unit is executing the first instruction.

17 Claims, 6 Drawing Sheets

METHOD FOR REDUCING PEAK POWER IN DISPATCHING INSTRUCTIONS TO MULTIPLE EXECUTION UNITS

FIELD OF THE INVENTION

The field of the invention relates to scheduling and dispatching of instructions in a computer system. More specifically, the invention relates to a method for reducing peak power of a microprocessor in dispatching instructions to multiple execution units.

BACKGROUND OF THE INVENTION

Prior art microprocessor designs employ a variety of architectural features in order to increase instruction processing speed. For instance, superscalar microprocessors employ parallel execution units and are therefore capable of processing multiple instructions within a single clock cycle. Pipelined microprocessors divide the processing of an operation into separate pipe stages and overlap the pipestage processing of subsequent instructions to achieve execution throughput of at least one instruction per cycle.

Another prior mechanism by which the speed of a microprocessor can be increased is out of order execution of instructions. Non-data dependent instructions are dispatched to parallel execution units without regard to the order in which the instructions appear in the user code, thus allowing instructions to be executed earlier. One example of such a processor is the PentiumAE Pro processor from Intel Corporation of Santa Clara, Calif., the corporate assignee of the present invention. Out of order execution is described in detail in the Pentium Pro Family Developer's Manual, volumes 1–3 (1996), available from Intel Corporation of Santa Clara, Calif.

An example computer system including an out of order execution microprocessor is illustrated in FIG. 1. Instructions and data enter and exit the microprocessor 120 on the system bus 110. Moreover, data is transferred to and from the second level (L2) cache via the system bus 110. The system bus 110 may also be coupled to one or more microprocessors, memory devices, or peripherals.

The bus interface unit 121 of the microprocessor 120 communicates with the system bus 110 and the L2 cache 130. The L2 cache 130 may reside outside of the microprocessor 120, as shown in FIG. 1, or may reside on the same piece of silicon as the microprocessor 120. The first level (L1) instruction cache 122 and data cache 123 are also coupled to the bus interface unit 121 in order to communicate with devices residing on the system bus 110.

Instructions are fetched by the bus interface unit 121 in the form of an instruction stream. The instruction stream is typically a block of data from a memory device residing on the system bus 110. The fetch and decode unit 124 accepts the instruction stream from the bus interface unit 121 and decodes the instructions into a series of micro-operations. These micro-operations are represented as instruction pool 127.

The dispatch and execute unit 125 accepts instructions 127 and resolves data dependencies between them. The instructions are then scheduled to be executed by one or more execution units. Because the microprocessor is an out of order execution engine, the results from the execution units are merely speculative at this point. The retire unit 126 accepts the speculative results of the execution and determines which of the speculative results can "retire," or be committed to the microprocessor architectural state.

The out of order execution microprocessor 120 illustrated in FIG. 1 is capable of executing instructions quickly because several instructions 127 may be simultaneously executed by the dispatch and execute unit 125. FIG. 2 illustrates the arrangement of the execution units within the dispatch and execute unit 125.

The micro-operations from the instruction pool 127 are delivered to ports 220–224, each coupled to a plurality of execution units 231–239. Each port 220–224 represents a bus that is coupled to one or more execution unit. Because some ports, for example ports 0 and 1, are coupled to more than one execution unit, there must be a bus arbitration scheme to prevent bus contention while micro-operations are being scheduled to the execution units. One micro-operation may be scheduled to each port during each clock cycle. Thus, for the example shown in FIG. 2, a maximum of five micro-operations may be dispatched in parallel.

The micro-operations are dispatched to the execution units 231–239 when there are no more data dependencies. The micro-operation is no longer data dependent once the required data fields of the micro-operation are ready for execution. Each micro-operation includes fields for two data operands, called "sources," and a "destination" in which to store the result. Both source fields must be ready with data before the micro-operation is dispatched to the execution unit. Dispatch of micro-operations to the execution units will be discussed in more detail below.

For the example shown in FIG. 2, port 0 is coupled to an execution unit 231, a floating point execution unit 232 and a multimedia execution unit 233. Execution unit 231 is capable of executing a variety of integer micro-operations, and floating point execution unit 232 is capable of executing floating point micro-operations. Multimedia execution unit 233 is capable of executing micro-operations decoded from multimedia instructions. One example of a multimedia instruction format is the single instruction multiple data (SIMD) format. Thus, three different types of micro-operations (integer, floating point, and multimedia) may be scheduled to port 0. Port 1 is coupled to two execution units 234 and 235, and execution unit 235 is a multimedia execution unit. Ports 2, 3, and 4 are each coupled to only one execution unit. One or more of the execution units coupled to ports 2, 3, and 4 may be an address generation unit (AGU), for executing micro-operations that are used to compute addresses.

As mentioned previously, five micro-operations may be dispatched to the execution units at one time, provided the required resources, i.e. the data operands and the specific execution unit, are available. Conceivably, therefore, at times five execution units may operate simultaneously.

One disadvantage of operating multiple execution units simultaneously is that the power consumed by the microprocessor correspondingly increases. The microprocessor power fluctuates at various times, depending on the number of execution units that are operating at one time. The "peak power" is defined as the amount of power that the microprocessor consumes at its peak, which may occur when all of the execution units are operating at one time.

Some execution units consume more power than others. For example, a Pentium Pro Processor was tested at an operating voltage of 2.5 volts and a frequency of 200 megahertz (MHz). The integer execution unit consumed approximately 550 milliwatts (mW) of power. The address generation unit consumed approximately 660 mW of power. The floating point unit consumed approximately 1.37 watts of power; 2–3 times more than the other two types of execution units. Thus it can be appreciated that the peak power of the microprocessor will fluctuate, depending on the types of execution units that are concurrently executing.

Peak power is an important parameter to take into consideration when designing a microprocessor. Many modern computers such as laptops, subcompacts and handhelds rely on battery power. Therefore, to increase battery lifetimes, it is essential to reduce the amount of power consumed by a microprocessor. Moreover, microprocessor packaging and cooling devices, such as heat sinks, must be designed with consideration to the peak power of the microprocessor. As the peak power of a microprocessor increases, the design of the microprocessor package and the cooling devices correspondingly becomes complex.

It is therefore desirable to provide a method of dispatching instructions to multiple execution units such that microprocessor peak power is reduced. Moreover, it is further desirable to provide a method of dispatching instructions such that one high-power execution unit is powered down while another is executing.

SUMMARY OF THE INVENTION

A method of reducing microprocessor peak power in dispatching instructions to multiple execution units is described. A first instruction is dispatched to a first execution unit. While the first instruction is being executed, a first signal is asserted. A second instruction is identified to be executed by a second execution unit that is capable of executing the second instruction in parallel with the execution of the first instruction. The second instruction is prevented from being dispatched to the second execution unit while the first signal is asserted. Thus, the second execution unit remains in an idle state while the first execution unit is executing the first instruction.

BRIEF DESCRIPTION OF THE DRAWINGS

The present invention is illustrated by way of example and not limitation in the accompanying figures.

DETAILED DESCRIPTION

A method for reducing peak power in dispatching instructions to multiple execution units is described. In the following description, numerous specific details are set forth, such as specific microprocessor pipeline stages, functional blocks, and scheduling algorithms, in order to provide a thorough understanding of the present invention. It will be apparent, however, to one skilled in the art that these specific details need not be employed to practice the present invention. In other instances, well known components or methods have not been described in detail in order to avoid obscuring the present invention.

The arbitration circuitry of the present invention provides for reduced peak power dissipation by a microprocessor. The circuitry and method are used to schedule micro-operations to multiple execution units, such that two high-power execution units are not powered up, or executing, at the same time. While one high-power execution unit is executing a micro-operation, the remaining high-power execution units are kept in a powered down, or idle, state.

The present invention is described with reference to a dynamic execution engine that executes micro-operations decoded from macroinstructions, as is characteristic of ×86 architecture microprocessors manufactured by Intel Corporation of Santa Clara, Calif. It should be appreciated, however, that the present invention may be implemented in other well-known computer architectures that employ parallel processing of instructions.

High power execution units, as described herein, are those that consume a large amount of power in executing a micro-operation in comparison with the other execution units within the microprocessor. One example of a high-power execution unit is the floating point execution unit that performs complex floating point calculations and may also perform complex integer instructions. Another example of a high-power execution unit is the multimedia execution unit. For one embodiment, the multimedia execution unit includes circuitry capable of executing single instruction multiple data (SIMD) operations. While the embodiment of the invention described herein is used to power down high-power execution units, it should be appreciated that the same may be used to power down any of the microprocessor execution units without departing from the scope of the invention.

One embodiment of the present invention is implemented within a reservation station of an out of order execution engine microprocessor. The reservation station is a buffer in front of the execution units that holds decoded micro-operations that are waiting for needed resources. The structure of the reservation station will be described in more detail herein below.

Figure 3:
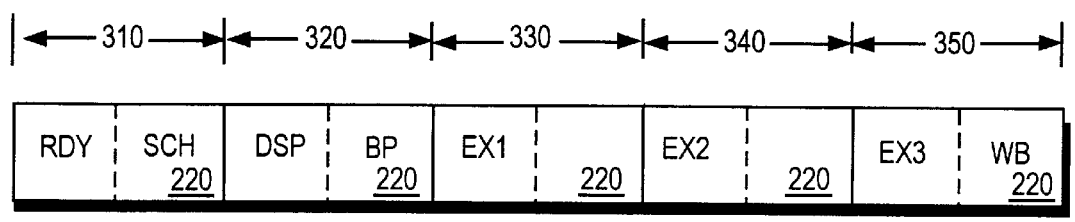
FIG. 3 illustrates a prior art microprocessor pipeline.

FIG. 3 illustrates a prior art pipeline diagram of the stages in which the reservation station is active. Each block illustrates one full clock cycle of the microprocessor. The dotted line represents the halfway point of the clock cycle.

During the first half of clock cycle 310, the reservation station determines whether the micro-operation is ready to be executed. During this cycle, the reservation station determines the availability and location of data resources for execution. Each micro-operation contains two fields that indicate sources, used as operands in the micro-operation. Each of the sources must be available in order for the micro-operation to be determined ready.

The source operands come from one of three places. The source operand may be an immediate, such that the source data is contained within the micro-operation itself. The source operand may be in a register or memory, such that the appropriate data must be retrieved by other micro-operations before execution can commence. Finally, some micro-operations have source operands that are dependent upon the results of micro-operations that are currently executing.

Therefore, it is possible that the micro-operation may have to wait for the result of the currently executing micro-operation. A write back bus is included on each port for the purpose of delivering the result back to the awaiting micro-operation. If it is determined that a source operand will be available on the write back bus in the next clock 320, then the reservation station will nonetheless treat the micro-operation as ready. As described below, the data for the source operand is then bypassed during clock cycle 320.

Once the micro-operation is determined to be ready during the first half of clock cycle 310, it is then scheduled in the second half of clock cycle 310. Typically, each port of the reservation station, e.g. ports 220–224 of FIG. 2, includes one scheduler. The schedulers attempt to dispatch as many micro-operations in parallel as possible. Recall that in the pipeline described in the background section, five micro-operations may be dispatched at one time. During the schedule phase of clock 310, each scheduler of the reservation station determines availability of applicable execution units and schedules the micro-operation for execution on the appropriate port.

The micro-operation is then dispatched during the first half of clock 320. During dispatch, the micro-operation is sent to the appropriate execution unit.

The second half of clock cycle 320 is the bypass stage. A bypass occurs when one of the source operands of the micro-operation is a result from one of the execution units. Rather than writing the result to its destination location, the reservation station receives the data on the writeback bus and bypasses it to the micro-operation about to be executed.

During the next clock cycles 330–350, the micro-operation is executed by the appropriate execution unit. This could take any number of clock cycles, depending on the type of operation being performed. The micro-operation illustrated in FIG. 3 takes three clock cycles to complete. In the second half of clock cycle 350, the resulting data is written back to either its appropriate destination location, or to a source operand of a micro-operation waiting to execute.

Figure 4:
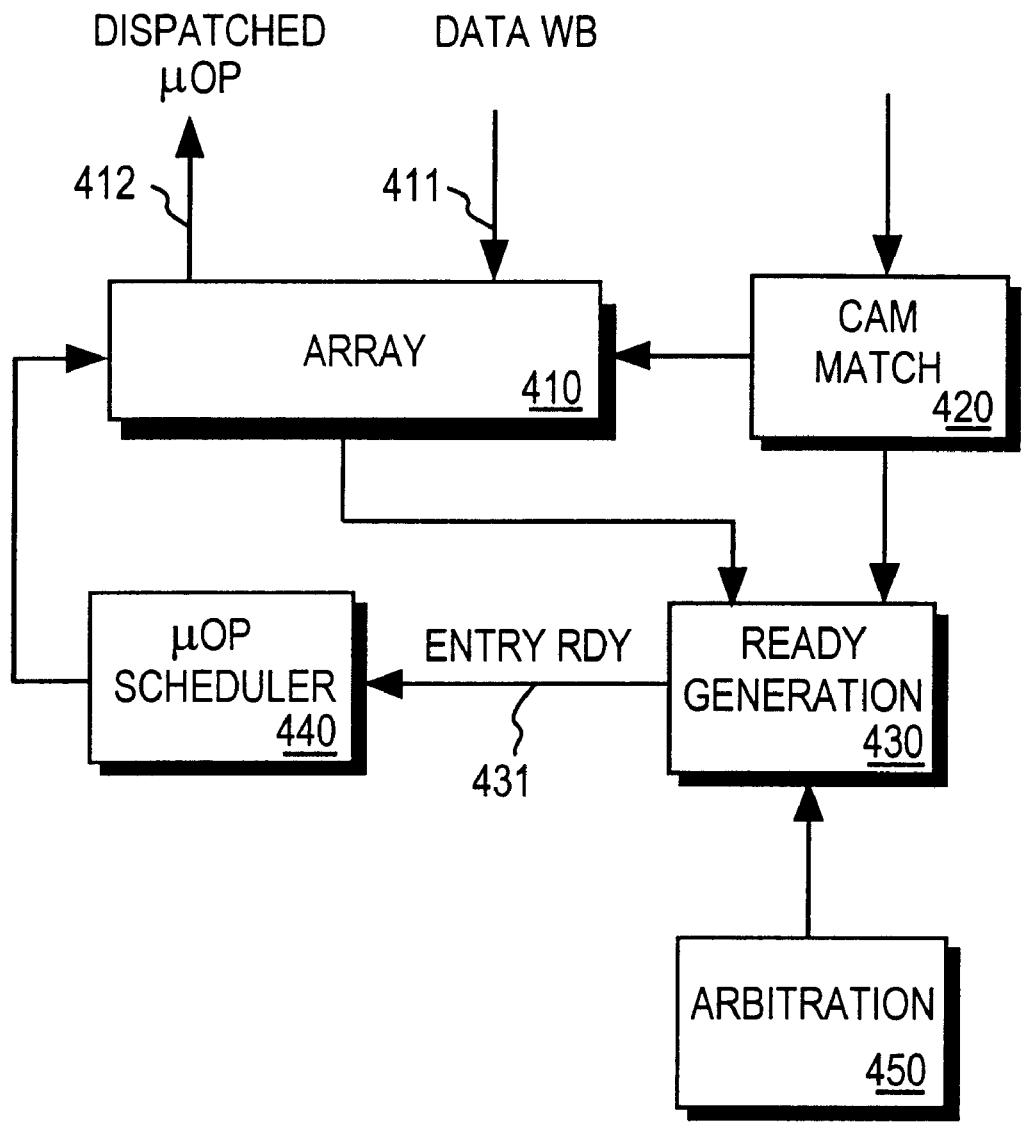
FIG. 4 illustrates a block diagram of a prior art reservation station.

FIG. 4 illustrates a block diagram of a prior art reservation station. Array 410 holds the micro-operations that are about to be scheduled. Each micro-operation has certain fields that must be written to before the micro-operation is dispatched to an execution unit. Control information (e.g. entry valid, micro-operation control, arbitration) is written to the array 410 from other units within the microprocessor that control allocation and retirement of the micro-operations. As described above, data information (i.e. the data for the source operands) is also written to the micro-operations residing within array 410.

The writeback bus 411 carries data that is written back from a micro-operation that has just been executed. The CAM match circuit 420 compares the destination of the currently executing micro-operation with the sources specified by the waiting micro-operation in the array 410. If there is a CAM match, then the writeback data is routed to the micro-operation in the array 410.

Each micro-operation will only be dispatched to an execution unit if a ready signal 431 has been generated by ready generation circuit 430. The ready signal 431 is generated once all of the required micro-operation fields have been written. The micro-operation scheduler 440 detects the assertion of the ready signal 431 and thereafter schedules the micro-operation to be dispatched to the execution units on lines 412.

The ready signal is also only generated when arbitration circuitry 450 determines that it is possible for the particular execution unit to accept a micro-operation. As mentioned previously, each port comprises one bus that interfaces with one or more execution units. Therefore, the function of the arbitration circuitry is to avoid bus contention on each port. For instance, if the results of an instruction are being written back to port 0, another instruction cannot be dispatched on port 0 at the same time. Some micro-operations take several clock cycles to execute and therefore the arbitration circuitry must know which instructions are being executed and how many clock cycles each will take to execute.

As explained herein below, the arbitration circuitry 450 is also responsible for controlling peak power by ensuring that two high-power execution units are not powered up at the same time. A method for reducing peak power by scheduling instructions to multiple execution units is therefore described.

In order to ensure that two high-power execution units are not simultaneously operating, two steps are taken. First, if two high-power execution units are coupled to the same port, then arbitration logic for that port ensures that no two micro-operations are simultaneously being executed. Second, if two high-power execution units reside on different ports, the scheduler coupled to one port must not dispatch a micro-operation to a high-power execution unit while a micro-operation is being executed by high-power execution unit on another port.

Figure 5:
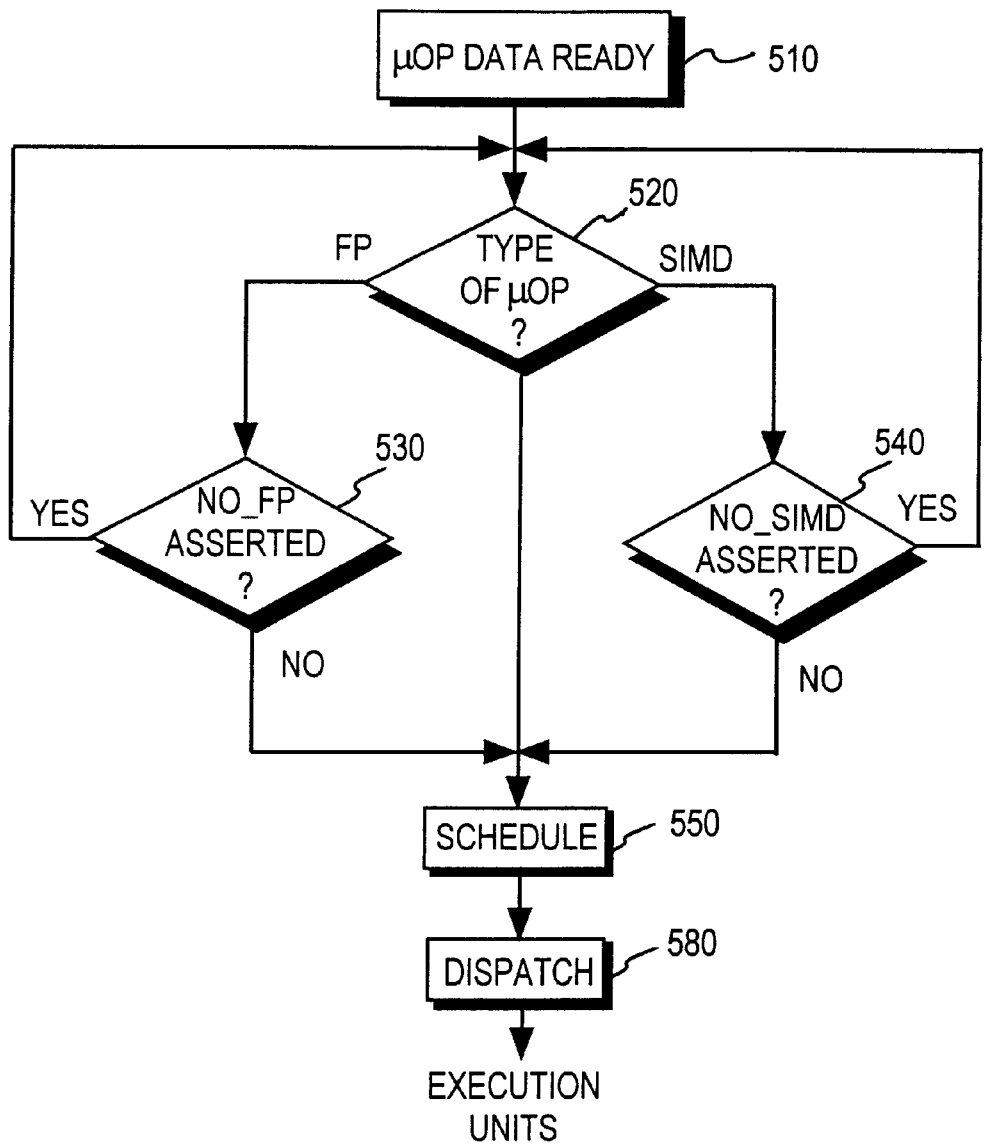
FIG. 5 illustrates a flow diagram of one scheduling method in accordance with the present invention.

FIG. 5 illustrates a flow diagram of the operation of arbitration circuitry for a single port (e.g. port 0). The flow diagram illustrates an arbitration scheme on a single port that is coupled to two high-power execution units. The arbitration circuitry therefore must control the dispatch of micro-operations such that the two high-power execution units are not operating simultaneously. The method of FIG. 5 is described with reference to circuitry illustrated in FIG. 4.

Figure 6:
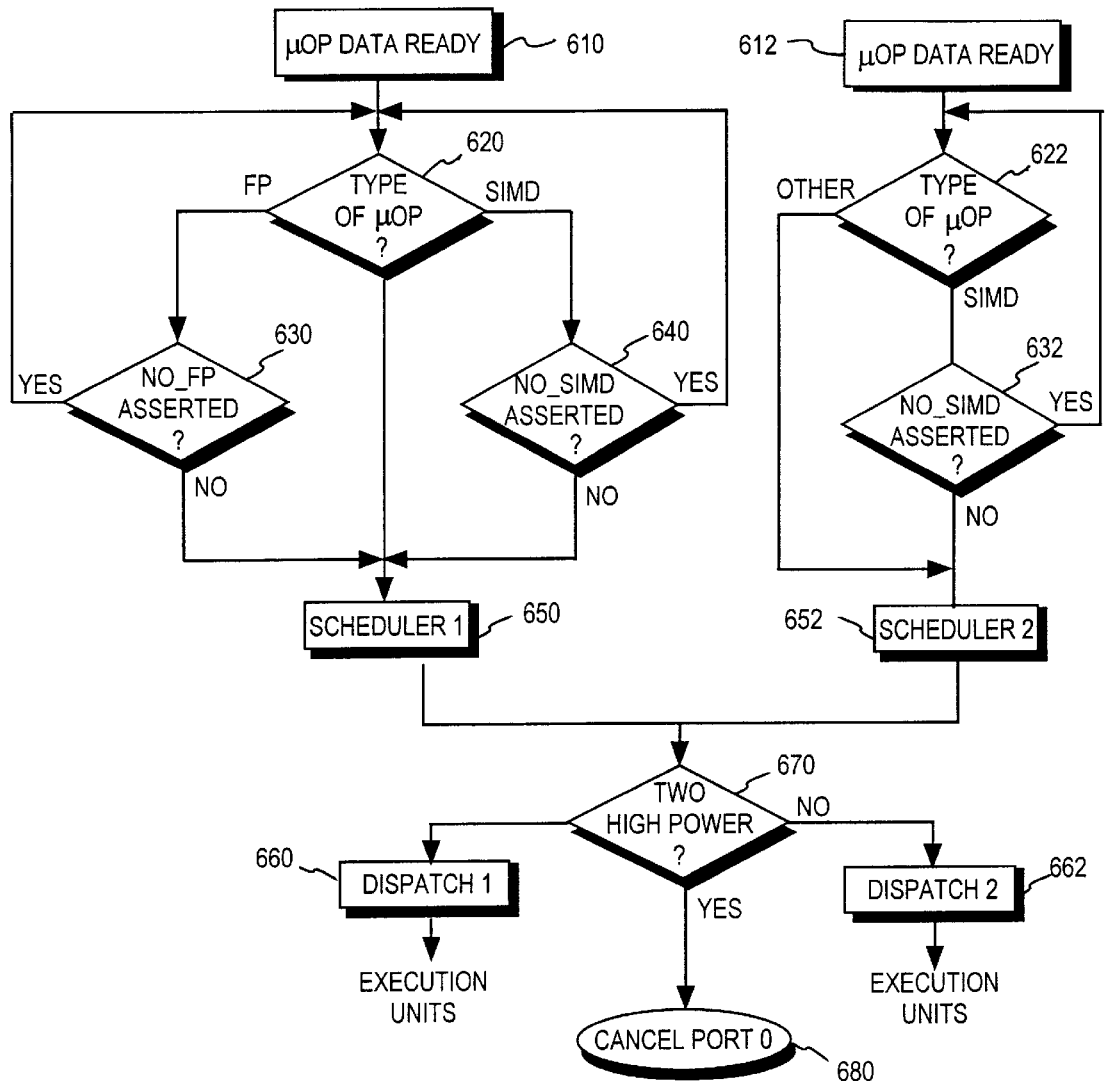
FIG. 6 illustrates a flow diagram of a second scheduling method in accordance with the present invention.

In one embodiment, the particular circuitry used to implement the flow diagrams of FIGS. 5 and 6 comprises a state machine designed according to a technique well-known by those skilled in the art.

For the embodiment shown in FIG. 5, the two high-power execution units residing on the port are a floating point execution unit, and a multimedia execution unit capable of executing SIMD instructions. It should be appreciated, however, that various other high-power execution units could be substituted therefor without departing from the scope of the present invention.

The micro-operation data becomes ready within the array 410 at step 510. Thereafter, step 520 illustrates that the arbitration logic takes two separate paths depending on which type of micro-operation is waiting to be executed. If the micro-operation is a SIMD micro-operation, then step 540 is performed next. If the micro-operation is a floating point micro-operation, then step 530 is performed next.

At step 540, the arbitration circuit checks for the assertion of a "no_simd' signal. The no_simd signal is asserted while a micro-operation is being executed by the floating point execution unit. For one embodiment, the no_simd signal is asserted within the reservation station. Alternatively the no_simd signal may be asserted by one of the execution units, such as the floating point execution unit or the multimedia execution unit, upon detecting execution of the micro-operation. For yet another embodiment, the reservation station asserts the no_simd signal for some number of clocks and an execution unit asserts the signal for the duration of the required clock cycles.

The no_simd signal remains asserted until the floating point execution unit has completed execution of the micro-operation and is in the writeback stage. At this point the data is written back to the port of the reservation station, and another micro-operation may be dispatched to either the multimedia or floating point execution units.

The SIMD micro-operation is then scheduled at step 550 in accordance with prior art scheduling methods described above.

If the micro-operation was determined to be a floating point micro-operation, then step 530 is performed. The arbitration logic checks for the assertion of the "no_fp" signal. Similar to the no_simd signal, the no_fp signal is asserted during execution of a micro-operation within the multimedia execution unit. During the assertion of the no_fp signal, the arbitration logic will not allow dispatch of a floating point micro-operation to the floating point execution unit on port 0.

Similarly to the no_simd signal, the no_fp signal may be asserted by the reservation station, one of the execution units, or a combination of each. The no_fp signal is deasserted when the result of the currently executing SIMD micro-operation is written back to port 0.

When the no_fp signal is deasserted, the floating point micro-operation may be scheduled at step 550 according to the prior art scheduling methods described above.

Note that back at step 520, if the current micro-operation was determined to be neither SIMD nor floating point, then the micro-operation was scheduled by the scheduler at step 550. Once each micro-operation has been scheduled, it is then dispatched to the appropriate execution unit on port 0 at step 560.

FIG. 6 illustrates flow diagram illustrating an arbitration technique for two individual ports (i.e. ports 0 and 1), as well as logic to communicate between the two ports. The arbitration scheme of FIG. 6 includes means by which one port communicates with another such that no two high-power execution units operate at the same time.

The flow diagram for port 0 is illustrated as steps 610, 620, 630, 640, 650, and 660. These steps are substantially the same as steps 510, 520, 530, 540, 550, and 560 of FIG. 5, explained in detail above.

Figure 1:
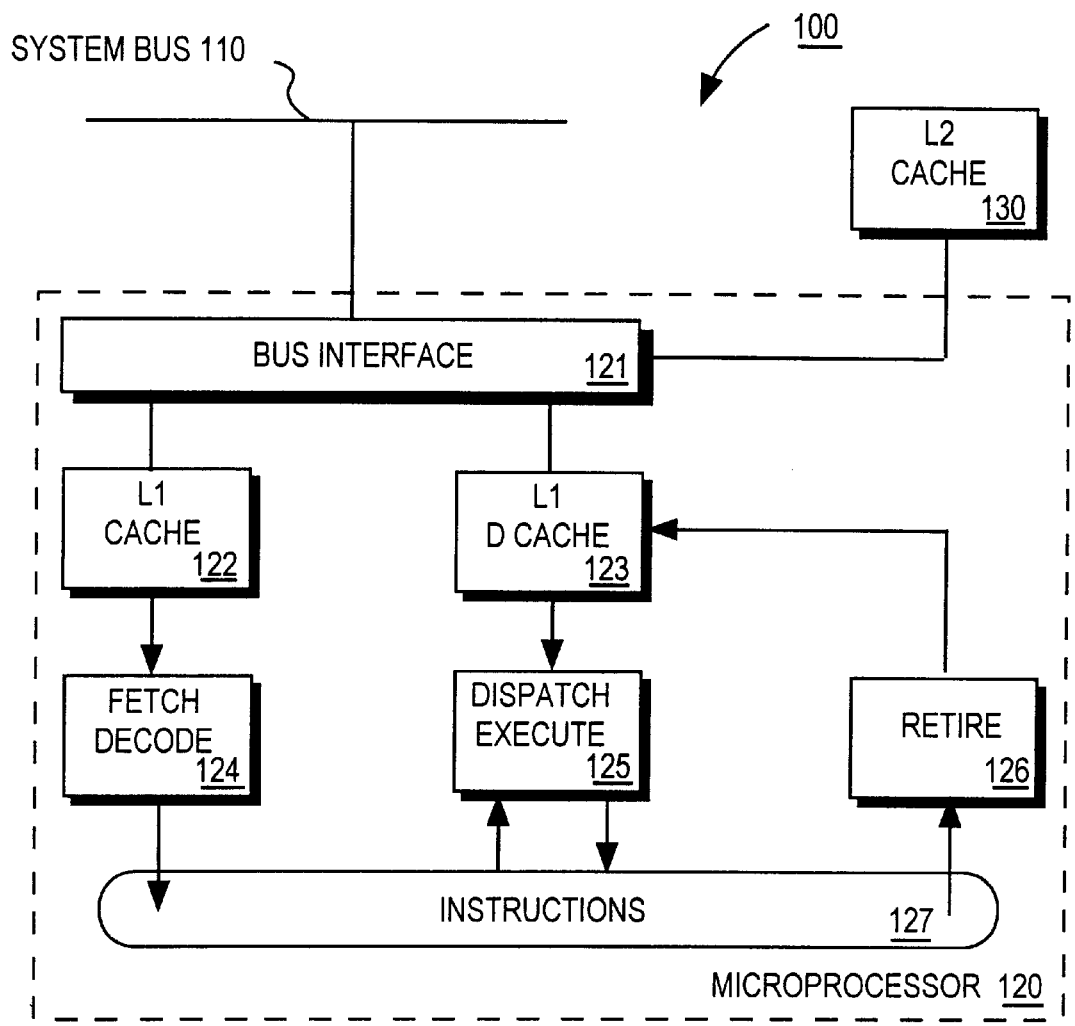
FIG. 1 illustrates a prior art dynamic execution processor in a computer system.
Figure 2:
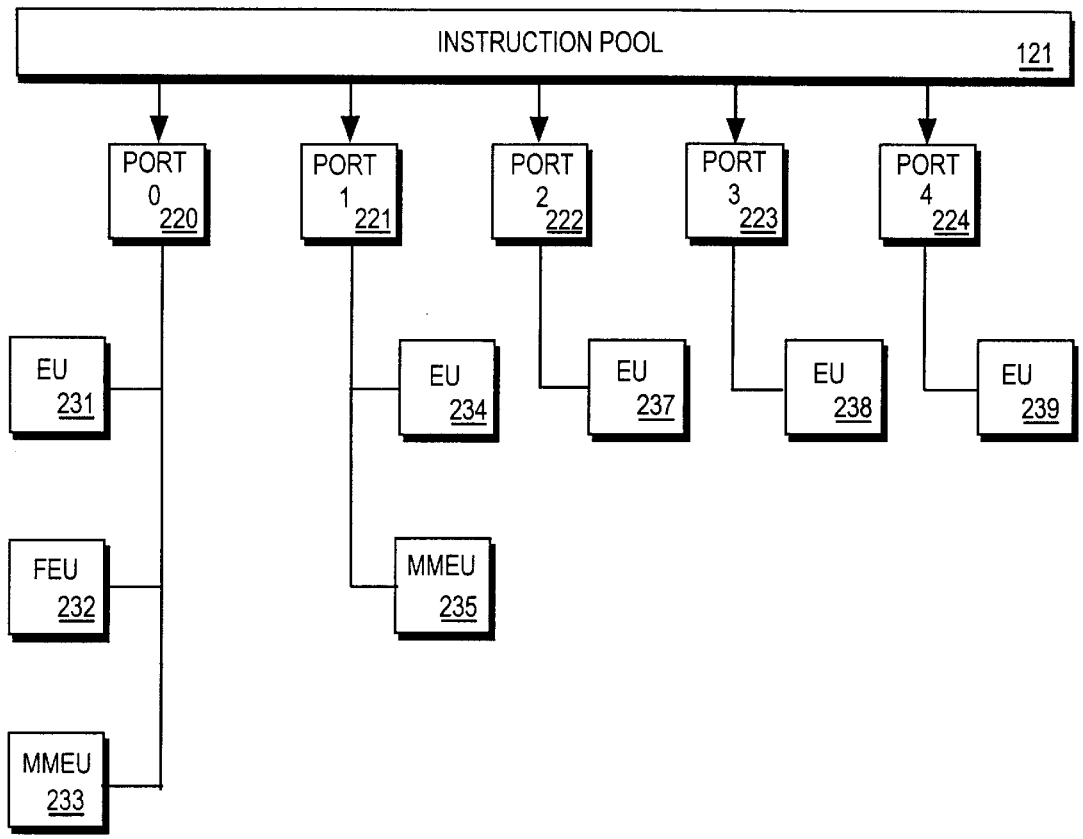
FIG. 2 illustrates a block diagram of a portion of a prior art dispatch and execute unit.

The flow diagram for port 1 is also included in FIG. 6. For the embodiment of the invention shown in FIG. 6, port 1 is configured as is illustrated in FIG. 2. Thus, port 1 is coupled to a multimedia execution unit 221. The multimedia execution unit 221 is a high-power execution unit and therefore is included in a micro-operation arbitration scheme that reduces peak power.

At step 612 the micro-operation data is ready. If it is determined that the type of micro-operation is SIMD, as is illustrated as step 622, then the arbitration logic checks for the assertion of the no_simd signal at step 632. For the embodiment of FIG. 6, the no_simd signal is asserted by circuitry of port 0 when a high-power execution unit coupled to port 0 is in operation.

For one embodiment, the no_simd signal is asserted by the arbitration logic of port 0 whenever a micro-operation is being executed by a high-power execution unit. Thus, if both the multimedia execution unit and the floating point execution unit of port 0 are high-power, the no_simd signal is asserted when either of these execution units are in operation. For another embodiment, the no_simd signal is asserted by the multimedia or floating point execution unit of port 0. For yet another embodiment, the no_simd signal is asserted by the arbitration logic of port 0 for a few of the clock cycles and by the appropriate execution unit of port 0 for the duration of the clock cycles.

Alternatively to the configuration described above, one of the multimedia execution units, such as the multimedia execution unit on port 0, may be designed to be lower power than the multimedia execution unit on port 1. The lower-power design may be accomplished by eliminating a functional circuit (e.g. a multiplier) from the multimedia execution unit on port 0. Both the multimedia execution unit on port 0 and the multimedia execution unit on port 1 may operate simultaneously without increasing the microprocessor peak power by a large amount. Thus, for this embodiment, the no_simd signal would be asserted only during execution by the floating point execution unit of port 0, but not during execution by the multimedia execution unit of port 1.

As was described above with reference to FIG. 5, the no_simd signal is deasserted once the currently-executing micro-operation has been executed in the execution unit and is in the writeback stage. At this point the waiting micro-operation is scheduled by scheduler 2 at step 652.

Note that if it was determined at step 622 that the micro-operation was not to be executed by the multimedia execution unit, then the micro-operation is scheduled at step 652 irrespective of the state of the no_simd signal.

The micro-operation is then ready to be dispatched at step 662. However, before the micro-operation is actually sent to the execution unit, it is determined whether or not two high-power micro-operations are being dispatched at the same time. This is shown as step 670, wherein it is determined if two SIMD micro-operations or a SIMD micro-operation and a floating point micro-operation are being dispatched by port 0 and port 1 concurrently. If this is true, then one of the micro-operations is canceled at step 680.

Recall that for one embodiment, only one of the multimedia execution units is a high-power execution unit. Thus, cancellation occurs when a SIMD micro-operation is being dispatched on port 1 simultaneously to a floating point micro-operation being dispatched on port 0.

Cancellation of a micro-operation inhibits it from being dispatched. The canceled micro-operation is held in the reservation station array, and it is rescheduled for a later time by the scheduler. The port 0 micro-operation is canceled at step 680. It should be appreciated by one skilled in the art that either micro-operation, whether on port 0 or port 1, may be canceled at step 680 without departing from the scope of the present invention.

Thus a method for reducing chip peak power in dispatching micro-operations to execution units is described. The method is performed by arbitration logic within a scheduler for scheduling micro-operations to multimedia and floating point execution units. Alternatively, the method of the present invention may be performed in a microprocessor that does not employ micro-operations. Moreover, the present invention may also be employed in a microprocessor employing various types of execution units.

In the foregoing detailed description a method for reducing chip peak power in dispatching instructions to multiple execution units is described. The method of the present invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for regulating power consumption within a microprocessor comprising:

dispatching a first instruction to a first execution unit of a plurality of execution units in the microprocessor, said plurality of execution units to execute a plurality of instructions in parallel; and preventing a second instruction from being dispatched by a reservation station in the microprocessor to a second execution unit of the plurality of execution units to self-regulate power consumption within the microprocessor responsive to said first instruction being dispatched to said first execution unit if said first and second execution units are both execution units of a high power consumption type.

2. The method of claim 1, further including:

dispatching said second instruction to said second execution unit upon completion of said first instruction.

3. The method of claim 2, wherein the dispatching said second instruction occurs when said execution of said first instruction is in a writeback stage.

4. The method of claim 1, wherein said first execution unit is coupled to a first port and said second execution unit is coupled to a second port.

5. The method of claim 4, wherein said preventing comprises:

identifying said second instruction to be executed by said second execution unit coupled to said second port; and canceling said second instruction from being dispatched.

6. The method of claim 1, wherein said first execution unit comprises a multimedia execution unit and said second execution unit comprises a floating point execution unit.

7. The method of claim 1, wherein said first instruction comprises a first micro-operation decoded from a first macroinstruction and said second instruction comprises a second micro-operation decoded from a second macroinstruction.

8. A method for regulating power consumption within a microprocessor comprising:

identifying a first instruction to be executed by a first execution unit in the microprocessor coupled to a first port;

identifying a second instruction to be executed by a second execution unit in the microprocessor coupled to a second port;

scheduling said first and second instructions to be dispatched to said first and second execution units in parallel; and canceling said first instruction from being dispatched by a reservation station of the microprocessor to self-regulate power consumption within the microprocessor upon detection that said second instruction is scheduled to be dispatched to said second execution unit if said first and second execution units are both execution units of a high power consumption type.

9. The method of claim 8, wherein said first execution unit comprises a multimedia execution unit and said second execution unit comprises a floating point execution unit.

10. The method of claim 8, wherein said first instruction comprises a first micro-operation decoded from a first macroinstruction and said second instruction comprises a second micro-operation decoded from a second macroinstruction.

11. A method for regulating power consumption within a microprocessor comprising:

dispatching a first micro-operation to a first execution unit of a plurality of execution units in a the microprocessor, said plurality of execution units to execute a plurality of instructions in parallel;

identifying a second micro-operation to be executed on a second execution unit of the plurality of execution units; and keeping said second execution unit in an idle state by a reservation station of the microprocessor to self-regulate power consumption within the microprocessor until said first execution unit has completed execution of said first micro-operation if said first and second execution units are both execution units of a high power consumption type.

12. The method of claim 11, wherein the keeping further comprises:

asserting a first signal during execution of said first micro-operation responsive to said execution, and preventing said second micro-operation from being dispatched to said second execution unit while said first signal is asserted.

13. The method of claim 12, further including:

deasserting said first signal during a writeback stage of said execution of said first micro-operation; and dispatching said second micro-operation to said second execution unit upon detecting the deassertion of said first signal.

14. The method of claim 11, wherein said first execution unit comprises a multimedia execution unit and said second execution unit comprises a floating point execution unit.

15. A microprocessor comprising:

an instruction array to store a plurality of instructions, and to dispatch selected ones of the plurality of instructions to a plurality of execution units, said plurality of execution units to execute instructions in parallel; and circuitry, coupled to said instruction array, to prevent a first instruction of the plurality of instructions from being dispatched to a first execution unit of the plurality of execution units to self-regulate power consumption responsive to a second instruction of the plurality of instructions being dispatched to a second execution unit of the plurality of execution units if said first and second execution units are both execution units of a high power consumption type.

16. The apparatus of claim 15 wherein:

said instruction array includes a first port and a second port to which said first and second execution units couple; and said circuitry prevents said first instruction from being dispatched while said second instruction is being executed by the second execution unit.

17. A method for regulating power consumption within a microprocessor comprising:

fetching a first instruction to be dispatched to a first execution unit of a plurality of execution units in the microprocessor, said plurality of execution units to execute instructions in parallel;

waiting in response to a second instruction executing in a second execution unit of the plurality of execution units by a reservation station of the microprocessor to self-regulate power consumption within the microprocessor if both the first and second execution units are execution units of a high power consumption type; and dispatching the first instruction to the first execution unit after execution of the second instruction.

* * * * *